No. 760,509. PATENTED MAY 24, 1904.
E. A. WRIGHT.
MOTOR VEHICLE.
APPLICATION FILED JAN. 31, 1901. RENEWED MAR. 22, 1904.
NO MODEL. 2 SHEETS—SHEET 1.
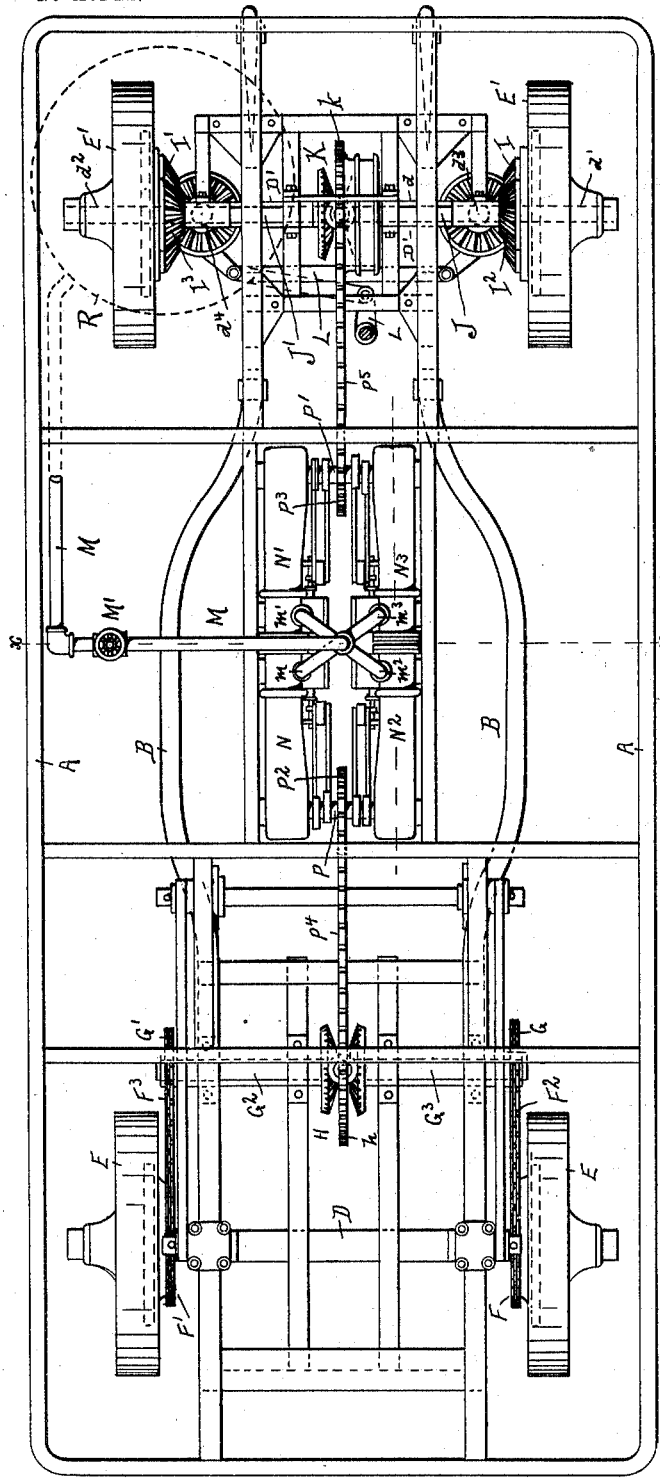
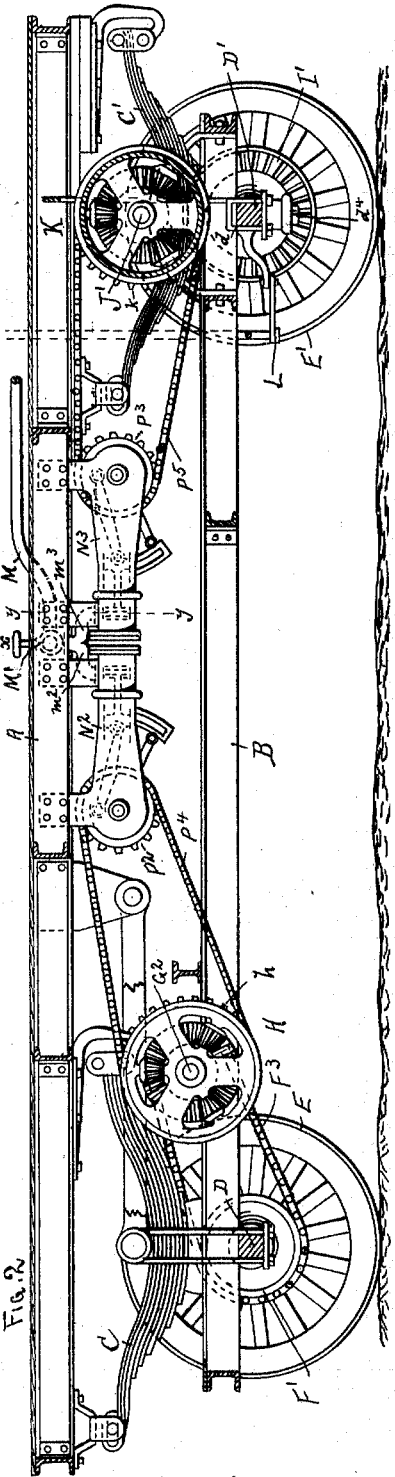

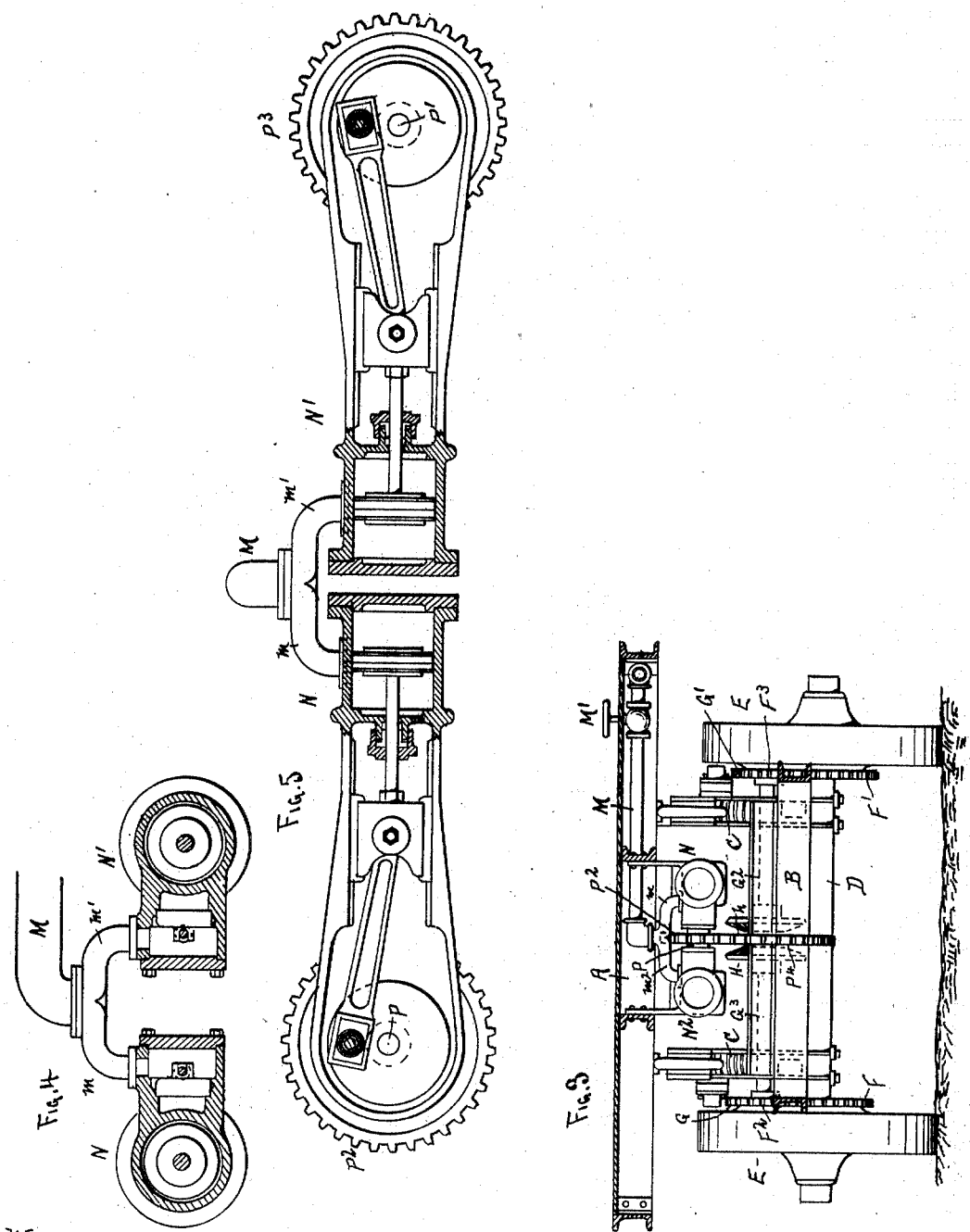

No. 760,509. Patented May 24, 1904.

UNITED STATES PATENT OFFICE.

EDGAR A. WRIGHT, OF CANTON, OHIO, ASSIGNOR TO THE AULTMAN COMPANY, OF CANTON, OHIO, A CORPORATION OF OHIO.

MOTOR-VEHICLE.

SPECIFICATION forming part of Letters Patent No. 760,509, dated May 24, 1904.

Application filed January 31, 1901. Renewed March 22, 1904. Serial No. 199,431. (No model.)

*To all whom it may concern:*

Be it known that I, EDGAR A. WRIGHT, a citizen of the United States, residing at Canton, in the county of Stark and State of Ohio, have invented certain new and useful Improvements in Motor-Vehicles, of which the following is a specification, reference being had therein to the accompanying drawings.

Figure 1 is a plan view with the "deck" removed. Fig. 2 is a sectional side elevation. Fig. 3 is a transverse section on the line $x\ x$ of Fig. 1. Fig. 4 is an enlarged transverse section on the line $y\ y$ of Fig. 2. Fig. 5 is an enlarged detail in section of the engines in section through the cylinders.

In this apparatus is comprised a platform A, supported upon a truck-frame B, as by springs C C', the truck-frame having rear axle D, forward axle D', rear carrying-wheels E, and forward carrying-wheels E'. The rear carrying-wheels are provided with chain-wheels F F', connected by chains $F^2\ F^3$ to chain-wheels G G' on the outer ends of a two-part counter-shaft $G^2\ G^3$, journaled transversely of the truck-frame and united at the inner ends by a compensating gear, (represented as a whole at H.) The central member of the compensating gear H is in the form of a chain-wheel $h$, so that power applied thereto will be communicated equally to the carrying-wheels E through the chain-wheels and chains above noted.

The forward carrying-wheels E' are provided with bevel-gears I I', adapted to be actuated through trains of bevel-gears $I^2\ I^3$ from a transverse two-part counter-shaft J J', the latter journaled upon the truck-frame and united at the inner ends by a compensating gear, (represented as a whole at K.) The central member of the compensating gear is in the form of a chain-wheel $k$, so that power applied thereto will be communicated equally to the carrying-wheels E' through the bevel-gears above noted.

The forward axle D' is formed in three parts—central part $d$ and end parts $d'\ d^2$, the end parts carrying the wheels E' and united to the ends of the central part by vertical pins, (indicated by dotted lines at $d^3\ d^4$,) and the bevel-gearing is so arranged and connected that the wheels E' may be turned, as by the levers L, to guide the vehicle without affecting the counter-shaft J J' or the compensating gear K carried thereby.

Supported by the platform-framework A are two or more engines, all arranged to be supplied with steam or other power by one supply-pipe M common to all the engines and provided with a throttle-valve, (indicated at M'.) In the drawings four engines are shown, (indicated at N N' $N^2\ N^3$,) the engines N $N^2$ coupled to actuate one common shaft P and the engines N' $N^3$ coupled to actuate one common shaft P'. This is the preferable arrangement; but one or more engines may be arranged to actuate each of the shafts P P', if circumstances require it. The shafts P P' are supplied with chain-wheels $P^2\ P^3$, connected, respectively, by chains $P^4\ P^5$ to the central chain-wheel members $h\ k$ of the compensating gears H K, as shown.

The supply-pipe M branches, as at $m\ m'\ m^2\ m^3$, to the four valve-chambers $n\ n'\ n^2\ n^3$ of the four engines N N' $N^2\ N^3$, as shown, so that the steam or other power employed will flow equally to all the engines at all times and a free communication maintained continuously between all the engines and the common supply-pipe, so that the pressure is equalized in all the engines. The strains throughout the whole vehicle are thereby perfectly equalized, and any inequality of strain or pressure will be at once absorbed by the connected mechanism and distributed equally throughout all the parts, and by arranging the compensating gearing between the engines and the carrying-wheels any inequality of strains exerted upon the wheels will be likewise equalized and distributed. The whole apparatus is thus rendered automatically adaptable to the varying conditions of the road-bed and strains effectually prevented from being unequally exerted on any part of the machine.

The boiler may be of any improved construction and may be located at any convenient point on the bed-frame A—as, for instance, at one of the forward corners, as indicated by dotted lines at R.

The power employed will generally be steam; but compressed air or other similar power may be employed.

What I claim is—

1. In a motor-vehicle the combination of front traction-wheels, rear traction-wheels, an actuating mechanism for said front wheels, an actuating mechanism for said rear wheels independent of that for said front wheels, a pair of connected engines connected wholly with one of said actuating mechanisms, a second pair of connected engines connected wholly with the other of said actuating mechanisms and independent of said first pair, and a common source of fluid-pressure for said engines.

2. The combination of front and rear traction-wheels, a pair of connected engines, means for applying equal independent driving pressures from said pair of engines to said front wheels individually, a second pair of connected engines independent of said first pair, means for applying equal independent driving pressures from said second pair of engines to said rear wheels individually, and a common source of fluid-pressure for all of said engines.

3. The combination of the main frame having traction-wheels at one end and traction and steering wheels at the other end, a pair of engines connected with the traction-wheels to drive the same, a pair of engines independent of the first pair and connected with said traction and steering wheels to drive the latter independently of the former wheels, and means for supplying a common driving pressure to said engines.

4. The combination of the main frame having traction-wheels at one end and traction and steering wheels at the other end, a pair of engines connected with the traction-wheels to drive the same, a pair of engines independent of the first pair and connected with said traction and steering wheels to drive the latter independently of the former wheels, and means for supplying a common driving pressure to said engines, said engines being arranged centrally of and beneath the main frame between the front and rear wheels.

5. The combination of the main frame, traction-wheels at one end thereof, traction and steering wheels at the other end thereof, an engine, longitudinal chain and compensating gear driving said traction-wheels from said engine, a second engine independent of the first having a longitudinal chain and compensating gear connecting the second engine with the traction and steering wheels and independent of the driving mechanism of the first engine, and means for supplying a common driving pressure to said engines.

6. The combination of the main frame, traction-wheels at one end thereof, traction and steering wheels at the other end thereof, a pair of engines, a longitudinal chain running from a point between said engines, a compensating gear connected with said traction-wheels and with said chain, a second pair of engines independent of the first pair, a longitudinal chain running from a point between said second engines, a compensating gear connected with the driving and traction wheels and with the latter chain, and means for supplying a common driving pressure to said engines.

7. In a motor-vehicle, two or more engines having one common supply-pipe whereby power is supplied equally to all of said engines, the forward driving-gear, the rear driving-gear, means for independently connecting one or more of said engines to said forward gear, and means for independently connecting one of said engines to said rear gear, and compensating gearing between said engines and said front and rear gears whereby all strains are equalized and uniformly distributed, substantially as set forth.

8. In a motor-vehicle, two or more engines having one common supply-pipe and one common throttle-valve, whereby power is supplied equally to all the engines, a forward axle having independent carrying-wheels, a rear axle having independent carrying-wheels, means for independently connecting one or more of said engines to actuate said forward carrying-wheels, and means for independently connecting one or more of said engines to actuate said rear carrying-wheels, substantially as set forth.

9. In a motor-vehicle, two or more engines having one common supply-pipe and one common throttle-valve, whereby power is supplied equally to all the engines, a forward axle having independent carrying-wheels, a rear axle having independent carrying-wheels, means for independently connecting one or more of said engines to actuate said forward carrying-wheels, and means for independently connecting one or more of said engines to actuate said rear carrying-wheels, and compensating gears between said engines and said carrying-wheels, substantially as set forth.

10. In a motor-vehicle, a bed-frame, a truck-frame connected to said bed-frame, the running-gear supported from said truck-frame, two or more engines supported from said bed-frame, a supply-pipe common to all of said engines whereby power is distributed equally to all of said engines, means whereby one or more of said engines are connected independently to actuate said forward running-gear, and means whereby one or more of said engines are connected to actuate said rear running-gear, substantially as set forth.

11. In a motor-vehicle, a bed-frame, a truck-frame connected to said bed-frame, the running-gear supported from said truck-frame, two or more engines supported from said bed-frame, a supply-pipe common to all of said engines whereby power is distributed equally to all of said engines, means whereby one or more of said engines are connected independently to actuate said forward running-gear, means whereby one or more of said engines are connected to actuate said rear running-gear, and compensating gearing between said engines and said running-gear, substantially as set forth.

12. In a motor-vehicle, a bed-frame, a truck-frame connected flexibly to said bed-frame, the forward axle, the rear axle, bearing-wheels independently journaled upon said forward axle, bearing-wheels independently journaled upon said rear axle, two or more engines supported from said bed-frame, a supply-pipe common to all of said engines, means whereby one or more of said engines are connected to independently actuate said forward bearing-wheels, and means whereby one or more of said engines are connected to independently actuate said rear bearing-wheels, substantially as set forth.

In testimony whereof I affix my signature in presence of two witnesses.

EDGAR A. WRIGHT.

Witnesses:
 PRIMUS PHILIPPI,
 W. R. BAXTER.